United States Patent [19]

Learner et al.

[11] Patent Number: 4,779,983

[45] Date of Patent: Oct. 25, 1988

[54] BEAM SPLITTER AND SPECTROMETER CONTAINING THE BEAM SPLITTER

[75] Inventors: Richard C. M. Learner; Anne P. Thorne, both of London, England

[73] Assignee: Chelsea Instruments Limited, London, England

[21] Appl. No.: 860,313

[22] Filed: May 6, 1986

[30] Foreign Application Priority Data

Mar. 5, 1986 [GB] United Kingdom ................. 8605419

[51] Int. Cl.⁴ .......................... G01J 3/45; G01D 9/02
[52] U.S. Cl. ..................................... 356/346; 350/169
[58] Field of Search ................ 356/346, 345; 350/169, 350/172

[56] References Cited

U.S. PATENT DOCUMENTS

4,193,693  3/1980  Schindler ........................... 356/346
4,426,155  1/1984  Monchalin ......................... 356/346
4,585,345  4/1986  Inoue ................................... 356/346

Primary Examiner—Vincent P. McGraw
Assistant Examiner—S. A. Turner
Attorney, Agent, or Firm—Hall, Myers & Rose

[57] ABSTRACT

The beam splitter comprises an optical, parallel sided, plate having partially reflecting coatings applied on each half side in alternate halves and having opposite alternate uncoated half sides covered by respective matching transparent wedge plates which are optically adhered to the parallel sided plate and arranged thereon in respective opposite directions. A spectrometer for analysing vacuum ultra-violet light comprises a vacuum tank containing the beam splitter and a pair of cat's eye retroreflectors which limit and define the optical paths of the rays of light reflected and transmitted by the beam splitter, one of which retroreflectors is translated along the respective paths at constant velocity during the course of each measurement. A laser beam of different wavelength to that being examined is reflected into separate and parallel paths and the recombined laser beam is detected, the signal therefrom providing a precise representation of the velocity of the translated retroreflector.

24 Claims, 5 Drawing Sheets

BEAM SPLITTER AND SPECTROMETER CONTAINING THE BEAM SPLITTER

The present invention relates to optical interferometers. In particular it concerns a modification of the classical Michelson interferometer and the adaptation of the modification to a spectrometer of relatively modest (i.e. table-top) size capable of use with electromagnetic radiations having wavelength from the near infra red, through the visible region, and into the ultra violet and vacuum ultra-violet regions of the spectrum.

BACKGROUND OF INVENTION

Interferometers, based on the Michelson principle, using beam splitters and making use of a computer to process a Fourier transform of the measurements have been employed in the infra red region through the visible region to the near ultra violet region of the spectrum. The conventional Michelson interferometer has a wedge-shaped single beam splitting plate, a single wedge-shaped compensation plate (both being of very small wedge angle), and a pair of spaced apart angled (usually orthogonally disposed) plane mirrors. The normal mode of use is to move one of the mirrors of the pair along the beam at a prescribed velocity whilst detecting the optical interference fringes which appear in the output beam. The inverse Fourier transform of the detected results then recovers the spectrum. However, it is necessary to achieve and maintain a precise alignment of the mirrors so that the departure from parallelism of the recombined wave fronts is nowhere more than a prescribed fraction of the wavelength (usually one-quarter) of the radiation being examined.

Some of the problems associated with the above-mentioned difficulty have been avoided in more recent times by employing retro-reflectors (i.e. cube-corner reflectors or the so-called cat's eye reflectors) to return the split beams for recombination in place of the previously used plane mirrors. These enable a precisely parallel alignment of the incident and reflected beams of the reflectors to be automatically maintained irrespective of the angular alignment of the respective reflector to the incident beam, even during displacement of the movable reflector. However, the consequence of using retro-reflectors is that there is a lateral displacement of the reflected beam relative to the incident beam and therefore recombination takes place at a different site to that at which the beam is split. Moreover the passage of the beam through the substrate shears the beam in such a way that the separation between incoming and outgoing beams is different for the two retro-reflectors, increasing the likelihood of wave front errors.

An alternative arrangement uses two spaced apart reflectively coated plates to split and recombine the beams. These may be given matched wedge angles to deal with the satellite fringes. If the two halves have reflecting coatings on opposite faces, the reflected beam and the transmitted beam are both treated optically in exactly the same way and no compensating plate is required.

The shear problem is dealt with for small angles of incidence by offsetting one plate along the axis of the beam relative to the other plate a distance of approximately one nth of its thickness (n being the refractive index of the substrate). However the reflective surfaces of the two plates must be maintained parallel to extremely fine tolerances for the interferometer to work at all, that is parallelism must be maintained to a small fraction of the shortest wavelength of radiation to be examined, and achieving this satisfactorily and preserving the setting over long periods is made more difficult by the aforesaid axial displacement of the plates. The problem becomes more difficult to overcome as the wavelength of the radiation reduces. Satisfactory resolution down to the 250 nm region of the spectrum has been achieved but the difficulty of achieving and maintaining the necessary very fine mechanical settings begin to impinge seriously at shorter wavelengths than this.

SUMMARY OF THE INVENTION

The object of the present invention is to provide a construction principle and a specific construction for an interference spectrometer whereby the aforesaid previous mechanical difficulties ar avoided. As a consequence, alignment problems in the beam splitter are not experienced and full advantage can be taken of the reduced wavelengths in the visible and ultra violet regions of the spectrum to reduce the size of the instrument. Thus it is a further object of the invention to provide an interference spectrometer capable of use down to and in the vacuum ultra-violet region of the spectrum which has a size comparable to that of a standard table top or less. A further object of the invention is to provide an improved beam splitter for an interferometer.

In its broadest form the invention comprises a beam splitter comprising an optically finished, single, transparent, beam splitting plate having a reflective coating covering each half side in alternate halves of the plate and also having matched compensating transparent wedge plates attached, by optical adherence, to the uncoated halves of the beam splitting plate and disposed so that, relatively, their wedge angles are oriented in opposite directions. Optical adherence (also known as optical contacting) is a well-known property of optical transparent bodies having corresponding conforming surfaces whereby when these corresponding conforming surfaces are brought together mechanically they exhibit an apparent bonding thereof.

The invention also provides an interference spectrometer wherein the beam splitting and the beam combining functions are performed by a single plate construction as immediately aforesaid, the incoming beam being split at the reflecting surface of one half of the plate and being recombined on the opposite side of the plate in the other half thereof, and said beams after splitting being reflected back to said plate by retro-reflectors one of which is displaceable along the axis of the respective beam incident upon it. In the preferred arrangement the beam splitting and beam combining take place in opposite quadrants of the interference plate and the apparatus incorporates a further optical system, including a laser which injects a monochromatic beam of known wavelength into the system so as to be split and recombined by the interference plate in the correspondingly adjacent quadrants thereof. This additional optical system serve to track the movement of the displaceable retro-reflector. Also in the preferred embodiment the displaceable retroreflector is moved through a prescribed distance and at a prescribed constant velocity during the measurement by means of a servo-controlled linear hydraulic motor.

Other objects and advantages of the invention will become apparent from the following detailed description of specific embodiments thereof with reference to the appended drawings.

Figure 1:
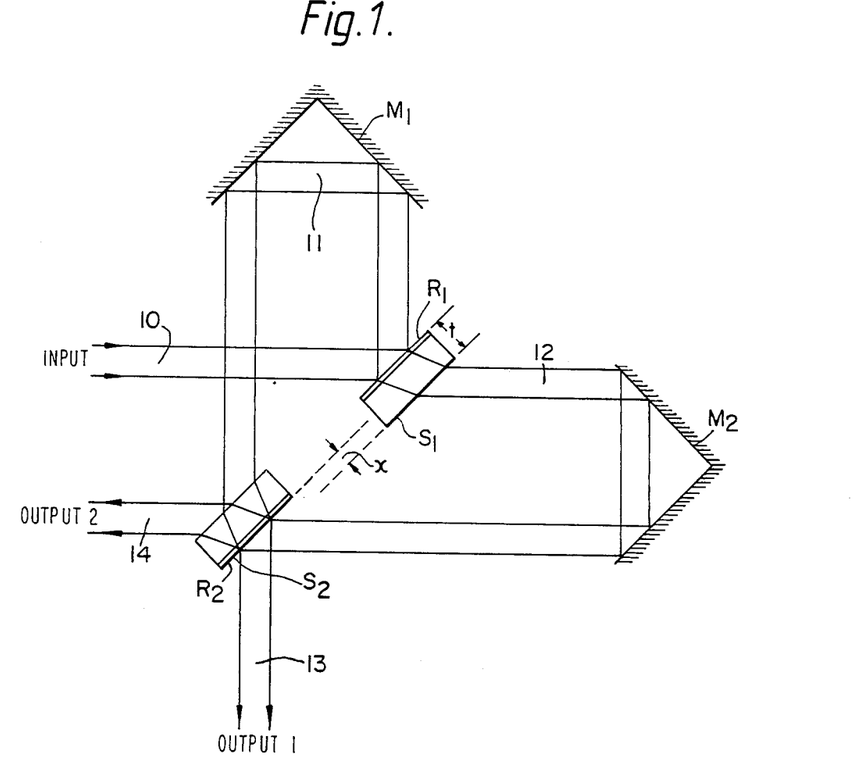
FIG. 1 shows a prior art optical arrangement of an interferometer.

In the prior art arrangement shown in FIG. 1 the input beam 10 is split at the reflective surface $R_1$ of a first beam splitter $S_1$ so that a reflected ray 11 is projected onto the cube corner reflector $M_1$ and the transmitted ray 12 is transmitted to the cube corner reflector $M_2$. The two rays then converge to the second beam splitter $S_2$, recombination taking place at the main reflective surface $R_2$. Output beam 13 is the main output beam of the device. Output beam 14 is a secondary beam. Both output beams contain interference fringes. To avoid a shear between the two beams at the recombination site the two beam-splitting plates $S_1$, $S_2$ are disposed so that they are not in a common plane. Instead one plate is displaced relative to the other along its axis by a distance 'x', where x is of the order t/n and where t is the thickness of the plate and n is the refractive index. This parallel plate disposition must be maintained within an extremely close tolerance amounting to a fraction of a wavelength of the radiation being examined over long periods for the interferometer to give repeatable results. In practice such an instrument is found to be suitable down to 250 nm but at this wavelength it is approaching the limit of its capability.

Figure 2:
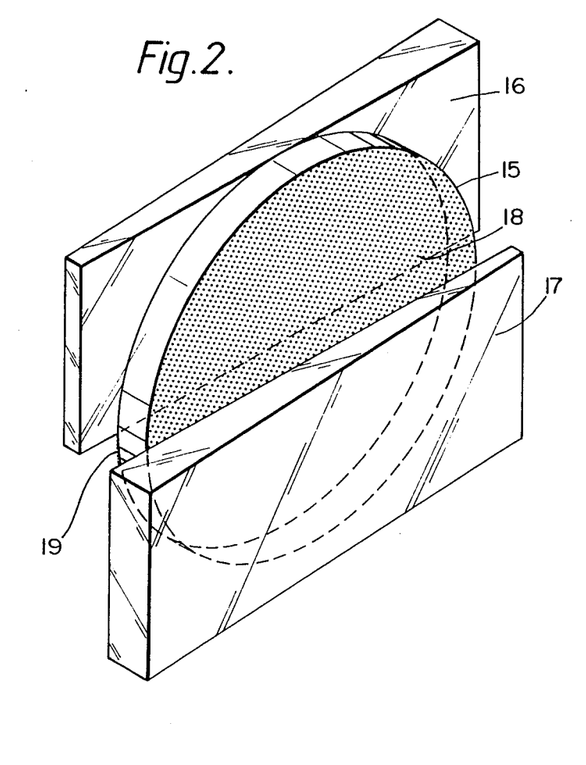
FIG. 2 shows a beam splitter according to the invention.

Referring now to FIG. 2, here is shown an improved beamsplitting plate which is comparatively simple to manufacture, easy to align in an interferometer and has excellent long-term mechanical stability. The new design exploits the well-known ability of some optical materials to form a strong glueless joint when two correspondingly conforming surfaces are brought together. This property is known as optical contacting or optical adherence.

The new beam splitter comprises three optically contacted components. The central component in a single plane parallelsurfaced transparent plate 15. Such plates can be manufactured accurately and comparatively cheaply to the necessary mechanical tolerances in parallelism and flatness. On either side of this plate are two identical transparent optical wedges 16, 17, of a form well known in the art and shown for the purpose of illustration with grossly exaggerated wedge angles. These may be formed from a single wedge plate having equal accuracy to that of the central plate 15. The single wedge plate is subsequently divided to form the two wedges and the wedges applied in opposite directions to the central plate with the aid of a jig. Lastly reflective materials such as dielectric films or metallic coatings 18, 19, are applied to the exposed halves of the central plate.

All these components are made using standard high-quality optical production techniques. The tolerance on the surfaces and on the homogenity of the material is a quarter wavelength of the shortest wavelength of interest, as in any two-beam interferometer, and the same tolerance applies to the parallelism of the surfaces of the central plate.

Ideally the relative thicknesses of the components are governed by the offset condition referred to above in the prior interferometer. Theoretically this requires the wedge thickness to be approximately twice that of the plate. A minimum thickness for the latter is set by the requirement that there should be no distortion thereof to any practical extent. The application of the aforesaid ratio to the wedges would, however, result in a beam splitter of unacceptable thickness and it is possible to achieve a suitable compromise in practice, taking into account the angle of incidence on the beam splitter and the aperture of the retroreflectors.

Figure 3:
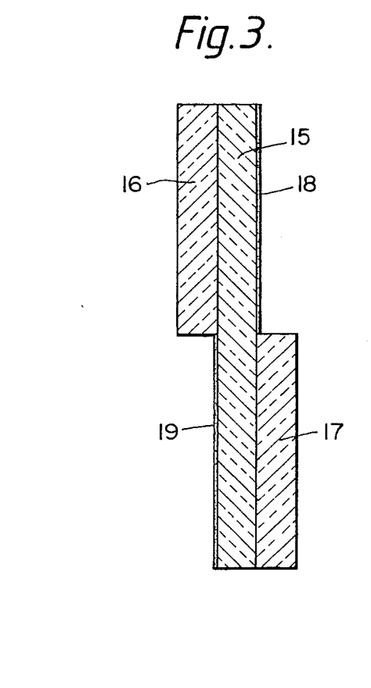
FIG. 3 is a cross section through the beam splitter of FIG. 2.

In the embodiment described hereinafter the beam splitter has an over diameter of 60 mm and each component thereof has a thickness of about 8 mm, giving an overall thickness of about 24 mm. A cross-section of the beam splitter is seen in FIG. 3.

Figure 4:
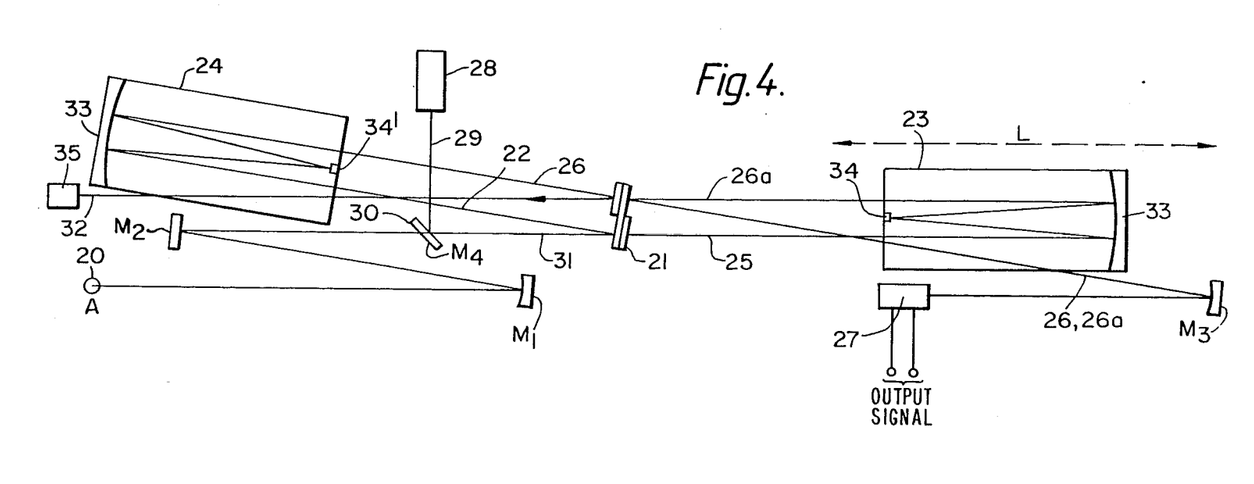
FIG. 4 shows the optical arrangement in the interferometer of an interference spectrometer according to the invention.

FIG. 4 shows in schematic form the optical arrangement in an interferometer of an interference spectrometer, utilising the beam splitter of the present invention. The radiation of interest is admitted through an aperture 20 and is collimated by mirrors $M_1$, folded by mirror $M_2$ and projected towards a movable retroreflector 23 so as to impinge upon a reflecting area on one exposed side of the central plate of the beam splitter 21. The latter is oriented so as to reflect a ray 22 out of the beam into a fixed retroreflector 24. A further ray 25 passes through the beam splitter and enters the movable retroreflector 23. After reflection in the respective retroreflectors, rays 26, 26a parallel respectively to rays 22, 25, are projected by the respective retroreflectors 24, 23 onto the other half of the beam splitter 21 where recombination takes place and the re-constituted beams 26, 26a pass to a focussing mirror $M_3$. From the mirror $M_3$ the light is then projected onto a photo-detector 27 of suitable construction dependent upon the wavelength of the radiation being examined.

Figure 5:
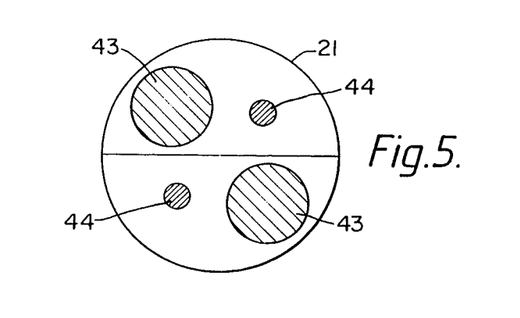
FIG. 5 shows the locations on the beam splitter of the reflective coatings provided for the signal and laser beams.

A laser 28, which may, for example, be a He-Ne laser, projects a beam of light 29 onto a mirror 30 which is positioned to one side of (behind in relation to the figure) the beam of radiation reflected by mirror $M_2$ so as not to obstruct this beam. A reflected beam 31 passes from mirror 30 to the beam splitter 21 in the same plane perpendicular to the drawing as the input radiation beam but is spaced apart therefrom. Therefore this beam is transmitted through and is reflected by a different area of the beam splitter 21 to that area involved in splitting the input radiation beam, and the divided rays of the laser beam follow similar paths as the radiation being examined but are always separated therefrom. As the two beams have different wavelengths, the areas of the exposed parts of the central plate of the beam splitter 21 upon which these beams are incident may have different reflective coatings to match the specific wavelengths. Conveniently these coatings may be restricted to the said areas of incidence. This may be more clearly understood by reference to FIG. 5, which represents the view of the beam splitter looking from the direction of the mirror $M_2$. The coatings 43, 44 are provided respectively for the input radiation beam and the laser beam 31 and comprise respectively a metallic film and a multiple-dielectric film.

A recombined output laser beam 32 is detected by means of a detector 35. The signals from the detectors 27 and 35 are both fed to a microprocessor for processing to derive an inverse Fourier transform of the detected fringes of the radiation being examined. Th signal due to the laser determines the instantaneous position of the movable retroreflector 23. Those skilled in the art will appreciate that the orientation of the beam splitter about its axis will depend upon the disposition of the input and laser radiations and may differ from the orientation shown in FIGS. 4 and 5.

Figure 6:
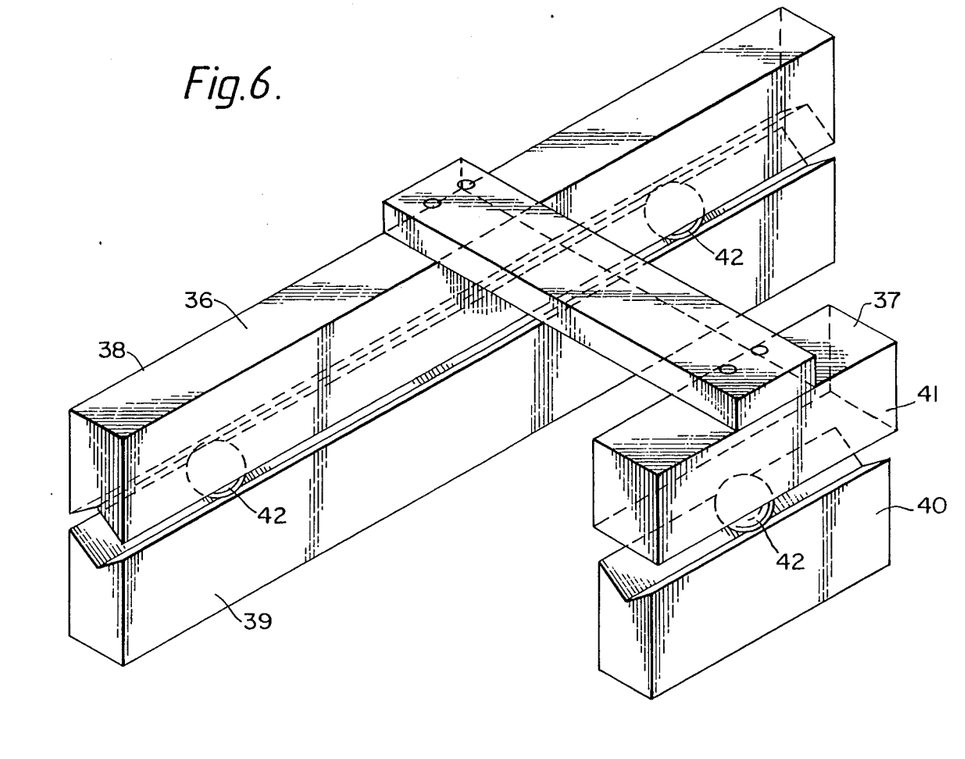
FIG. 6 shows a mount for the movable cat's eye retroreflector.

The two retroreflctors 23, 25 are identical and each essentially comprises a parabolic mirror 33, 33' and a small plane mirror 34, 34', the latter being disposed precisely at the focal point of the parabolic mirror. For convenience of manufacture the said mirrors are mounted respectively at opposite ends of identical aluminium open-ended boxes. This form of retroreflector is sometimes known as a cat's-eye reflector. The two boxes are arranged at opposite ends of the device along axes which are angularly displaced through a small angle, for example 10 degrees. One of the boxes, in this case retroreflector 23, is mounted on a frictionless slide so that it can move parallel to the axis of the beam 25. A suitable mounting for the movable box comprises a pair of guides 36, 37, formed on one side from a pair of V-bar runners 38, 39, and on the other side with a V-bar runner 40 co-operating with a flat bar 41, both having ball bearings 42 between the runners as shown in FIG. 6. The slide is coupled to some form of drive mechanism (not shown) which may, for example, comprise a rotating motor driving through a rack and pinion but which preferably comprises a linear hydraulic motor so as to avoid any periodic aberrations in the velocity. The signal derived from the laser beam by the microprocessor is preferably utilised by the motor controller as a feedback signal so as to ensure that the velocity of the retroreflector 25 remains constant throughout its displacement. The velocity may, for example, amount to 1 mm per second.

Mirrors $M_1$, $M_2$ and $M_3$ collimate, fold and focus the input and output beams within the instrument, thereby reducing its length. Mirror $M_2$ may be replaced by a diffracting grating to provide wavelength discrimination.

Typically, the spectrometer may be contained in an evacuated tank having a length of the order of 1¼ meters or less and a width and depth each of ¼ meter. A vacuum in the order of $10^{-3}$ to $10^{-4}$ Torr is desirable to avoid absorption of the radiation in the ultra violet wavelengths and to minimise fluctuation in air density due to thermal variations, noise, etc.

Figure 7:
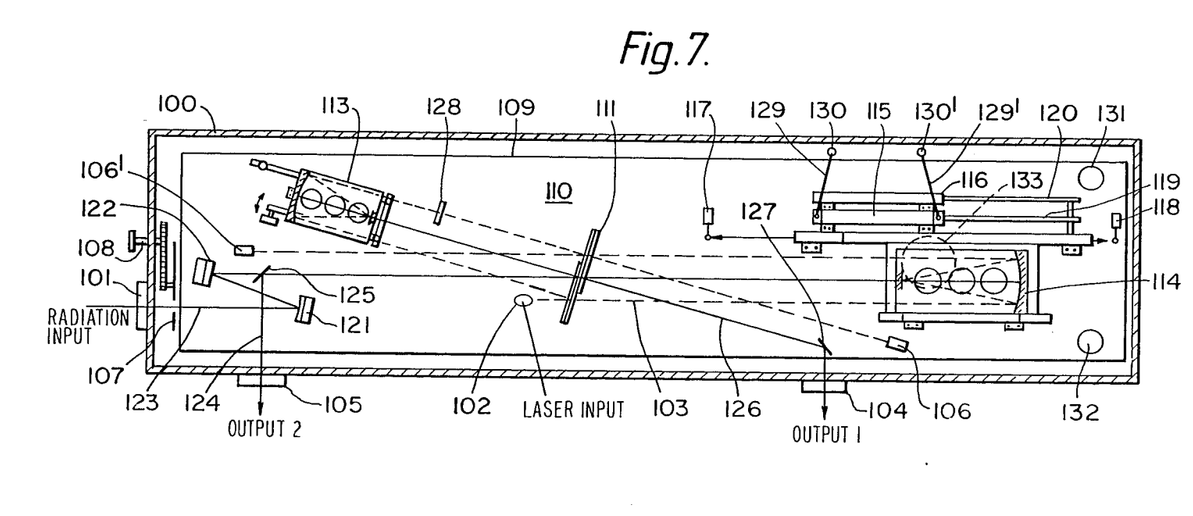
FIG. 7 shows a specific embodiment of an interference spectrometer according to the invention.

FIG. 7 shows a specific embodiment of an interference spectrometer based on the optical arrangement shown schematically in FIG. 4 but with minor modification as will be apparent from the following description. A vacuum tank 100 having a rigid base plate 109 on which the interferometer 110 is mounted and a sealable removable top (not shown) is provided with a first inlet window 101 through which the radiation to be examined is projected from outside to the interior, a second input window (not shown), vertically aligned with an aperture in the base plate and a mirror 102, through which a laser beam 103 is projected from a laser positioned outside the tank and first and second outlet windows 104, 105 through which the recombined output beams are projected from the interior of the chamber to external detectors. Each of these windows comprises a vacuum-tight port having an optical transparent plate of suitable radiation transmitting properties. The first inlet window also has an aperture-defining means associated therewith which is preferably in the form of a multi-apertured disc 107 within the vacuum chamber 100 having a number of apertures spaced around the disc. So that the aperture size may be remotely selected, the apertured disc is mounted on a geared rotatable shaft and is driven by an external stepping motor (not shown) coupled to a driven shaft 108 which passes through an air-tight gland in the side wall of the tank and has a gear which meshes with the gear on the shaft of the disc 107.

The laser beams, after recombination, are detected by separate internal detectors 106, 106'.

All the components of the interferometer 110 including the beam splitter 111 are mounted on the base plate 109. The cat's eye retroreflectors 113, 114 are supported on opposite sides of the beam splitter at each end of the plate. Retroreflector 113 does not move during the operation of the spectrometer and its respective support only provides small angular adjustments in the horizontal and vertical planes. Retroreflector 114 is mounted on a slide, of the type described with reference to FIG. 6, which forms part of an assembly. A hydraulic cylinder 115 and a linear potentiometer 116 form other parts of this assembly, as do also the limit switches 117, 118, and each part is attached to a stationary part of the assembly. The piston of the hydraulic cylinder 115 is mounted to a shaft 119 which extends out of the cylinder and is attached to a moving part of the slide. A slidable arm 120 extends from the potentiometer 116 and is also attached to the movable part of the slide. The limit switches 117, 118 are positioned at each end of the path followed by the movable part of the slide and each is operated thereby when the slide has reached the respective end of the path to provide a signal to external control neans (not shown) for actuating the hydraulic cylinder.

Mirrors 121 and 122 collimate and fold the input radiation beam 123 so that it impinges upon the reflective coating on the facing side of the angled beam splitter 111, one ray therefrom passing straight through the latter and being reflected by the retroreflector 114 onto the reflective surface on the other side of said beam splitter, and another ray being reflected by the first said reflective coating to the retroreflector 113 from whence it is returned to the wedge plate on that side of the beam splitter. In this embodiment the displacements of the rays by the retroreflectors 113, 114, take place in the plane perpendicular to the drawing and therefore the returning rays are not seen separately. Recombination of the rays takes place at the beam splitter 111, one output beam being reflected out of the instrument through the output window 105 by the plane mirror 125. A second output beam 126 is formed on the other side of the beam splitter and is reflected out of the instrument through output window 104 by means of a plane mirror 127.

The laser beam 103 is introduced into the interferometer by the mirror 102 along an axis which is laterally spaced from the plane containing the radiation which is being investigated. It is therefore optically separated therefrom. Displacement of the laser beams by the retroreflectors takes place in the plane of the drawing, all the optical paths of the laser beam being visible in FIG. 7. A quarter wavelength ($\lambda/4$) plate 128 is positioned in the path of the laser beam as it returns from the retroreflector 113 and provides a retardation of one component of polarisation of that part of the beam for reasons which will be explained hereafter.

Hydraulic hoses 129, 129' supply hydraulic fluid, under pressure to the cylinder 115, from vacuum-tight hydraulic input couplings 130, 130'. Electrical bulkhead couplings 131, 132 comprise the electrical means for providing electrical power into the tank 100 and for conveying the electrical signals therefrom. A port 133 in the base of the tank provides coupling means for coupling the tank to a means for drawing a vacuum within the tank and a further port in the base of the tank (not seen in FIG. 7) provides the input window for the laser beam.

The aforesaid windows may be substituted by other windows to suit the radiation being examined.

Before it is put into operation the tank is appropriately set up for receiving the radiation of interest. The optics are aligned with the aid of a laser beam. The movable retroreflector 114 is positioned at the end of its path of travel nearest to the adjacent end of the tank. The lid is then sealed and a vacuum is drawn. An appropriate aperture for the inlet window is selected. The laser is again switched on and the radiation being investigated is introduced into the instrument. Hydraulic fluid under pressure is then admitted to the cylinder 115, causing the movable retroreflector to move along the optical path of radiation. The rate of movement is controlled by a servo system which utilises the signal from one of the detectors 106, 106' in a feedback control loop. A signal is also provided from the potentiometer 116 which serves the purpose of identifying the position on its travel of the movable retroreflector 114 at any instant. At the end of the traverse of the retroreflector 114 the micro-switch 117 is operated, which causes a reversal of the hydraulic pressure. The retroreflector then resets to its starting position, the latter being indicated by the operation of micro-switch 118. The presence of the $\lambda/4$ plate 128 provides a change in the signal detected by the detector 106 in relation to that detected by detector 106' in dependence upon whether the retroreflector 114 is moving towards or away from the beam splitter 111 and this signal is used by the associated signal processing means, which is outside the tank.

It will be understood by skilled practitioners in the art that modifications of the embodiments described in relation to FIGS. 2-7 may be made without departure from the true scope of the invention. For example, the mirror 122 of the embodiment shown in FIG. 7 may be replaced by a reflecting grating which will provide a coarse filtering of the radiation before it enters the interferometer. All such modifications are to be considered within the spirit of the invention as defined in the appended claims.

We claim:

1. In a light interferometer for examining radiation having an optical path defined by an input beam and an output beam, said optical path containing a beam splitter upon which the input beam is incident and which splits the said beam into a reflected beam and a transmitted beam, a first beam reflector, a second translatable beam reflector, said reflectors for reflecting said split beams back to the beam splitter for recombination, and beam compensating means, the improvement in said beam splitter comprising:

(a) an optical element in the form of a beam splitter plate having a first and second sides in parallel alignment and being composed of material which is transparent to the radiation being examined,
   (b) first and second partially reflecting coatings, said first coating applied to a half-side of said first side of said beam splitter plate and said second coating applied to the alternate half side of said second side of said beam splitter plate, both said first and second coatings positioned at least within the areas in which the said input beam and said beams for recombination are incident, and
   (c) said beam compensating means comprising a first and a second matched transparent wedge plates, said first wedge plate being attached to the uncoated half-side of said first side of the beam splitter plate and said second wedge plate being attached to the uncoated half side of said second side where said first and second wedge plates are contiguous to said first and second uncoated half-sides, respectively, and arranged so that their wedge angles are oriented in respectively opposite directions,
   (d) wherein the said input beam and said beams for recombination are respectively incident upon and reflected from said first and second reflective coated areas of the first and second sides of the beam splitter plate.

2. An interferometer according to claim 1 wherein said wedge plates are optically adherent to the beam splitter plate.

3. An interferometer according to claim 1 or claim 2 wherein said first and second reflectors comprise cat's eye retroreflectors.

4. An interferometer according to claim 1 further comprising at least one photo detector in the path of said output beam.

5. An interferometer spectrometer for examining radiation comprising:

a housing having a first radiation input window and a first radiation output window and an interferometer therein aligned with said windows so as to receive an input beam of first radiation through said first radiation input window and to provide an output beam of first radiation through said first radiation output window, said interferometer comprising a beam splitter which splits the input beam of first radiation into a reflected beam and a transmitted beam, a first retroreflector, a second translatable retroreflector, said retroreflectors for reflecting the split beams back to the beam splitter for recombination and means for translating said second retroreflector along a split beam in said interferometer at a prescribed velocity, said beam splitter comprising an optical beam splitting plate, having first and second parallel sides and composed of material which is transparent to the radiation being examined, partially reflecting coatings applied on each alternate half-side of said first and second sides at least within the areas in which the said input beam and said beams for recombination are incident, and matching first and second transparent wedge plates covering, at least in part, the uncoated halves of said first and second sides, said wedge plates each being contiguous with the respective side of the beam splitting plate, attached thereto, and being arranged thereon so that their wedge angles are oriented in respective opposite directions, wherein the first and second retroreflectors are so arranged relative to the beam splitter that the said input beam and the beams for recombination are respectively incident upon and reflected from respective said coated areas in alternative opposite halves of the beam splitter plate.

6. An interferometer spectrometer according to claim 5 wherein said first and second retroreflectors are cat's eye retroreflectors, said first retroreflector has means for adjusting its alignment to the respective split beam and said second retroreflector is mounted on a slide and is coupled to a retroreflector translating means.

7. An interferometer spectrometer according to claim 6 wherein said translating means comprises a hydraulic power cylinder.

8. An interferometer spectrometer according to claim 7 wherein said translating means incorporates a position sensing means for providing an electrical signal representing the position in translation of said second retroreflector along its path of displacement.

9. An interferometer spectrometer according to claim 8 further comprising first and second limit switches for providing respective signals indicating when the second retroreflector has been translated to one or other of two predetermined limiting positions in its path of travel.

10. An interferometer spectrometer according to claim 5 wherein said housing includes a second input window and said interferometer incorporates a mirror aligned with said second window for reflecting a beam of second radiation into the input of the interferometer, and at least one output detector within said housing is aligned to detect a first output beam of second radiation.

11. An interferometer spectrometer according to claim 10 wherein said housing comprises a vacuum tank which contains air-tight connectors for enabling hydraulic power and electrical power to be admitted into the interior of the vacuum tank and electrical signals to be removed therefrom.

12. An interferometer spectrometer according to claim 10 wherein the optical path of said beam of second radiation in said interferometer includes polarizing means and a second detector, in said housing, said second detector having incident thereon a second output beam of second radiation.

13. An interferometer spectrometer according to claim 5 wherein the optical path of said first beam is folded by reflectors.

14. An interferometer spectrometer according to claim 12 wherein one of said beam-folding reflectors comprises a reflecting grating.

15. An interferometer spectrometer according to claim 5 wherein said housing has a second output window for transmitting a second output beam of said first radiation from the interferometer.

16. An interferometer spectrometer according to claim 5 including adjustable beam aperture defining means at said first input window.

17. An interferometer spectrometer according to claim 15 wherein said aperture defining means is adjustable from outside the housing.

18. An interferometer spectrometer according to claim 11 wherein said tank dimensions are of the order of 1½ meter long by ¼ meter wide and ¼ meter deep and said input beam of first radiation includes radiation selected from the band of radiation having the near infra red at one end and the vacuum ultra violet at the other end.

19. A beam splitter for a light interferometer comprising: an optical beam splitting plate having flat and optically parallel first and second side surfaces, first and second partially reflecting coatings applied respectively to said first and said second side surfaces, said coatings being applied on each of said side surfaces to prescribed alternate half surfaces as defined by a single plane perpendicular to said first and second surfaces which divides the plate surfaces in halves, and first and second transparent optical wedge plates having flat, non-parallel side surfaces and defining matching wedge angles, said first wedge plate being in side surface-to-side surface contact with the uncoated first side half, said second wedge plate being in side surface-to-side surface contact with the uncoated second side surface and said first and second wedge plates being arranged so that their wedge angles are oriented in respective opposite directions.

20. A beam splitter according to claim 19 wherein said wedge plates are optically adherent to the beam splitting plate.

21. A beam splitter according to claim 19 wherein said beam splitting plate and said wedge plates are each about 8 mm thick and said beam splitting plate has a diameter of about 60 mm.

22. A beam splitter according to claim 16 wherein said coated portion of said first side surface and said coated portion of said second side surface have a first area containing a metallic coating and a second area containing a dielectric coating.

23. A beam splitter according to claim 22 wherein said dielectric coating comprises a multiple-dielectric film.

24. A beam splitter for a light interferometer comprising: an optical beam splitting plate having flat and optically parallel first and second side surfaces, first and second partially reflecting coatings applied respectively to said first and said second side surfaces, said coatings being applied on each of said side surfaces to prescribed areas within alternate half surfaces as defined by a single plane perpendicular to said first and second surfaces which divides the plate surfaces in halves, and first and second transparent optical wedge plates having flat, non-parallel side sufaces and defining matching wedge angles, said first wedge plate being in side surface-to-side surface contact with and optically adhered to the uncoated first side half, said second wedge plate being in side surface-to-side surface contact with and optically adhered to the uncoated second side surface, and said first and second wedge plates being arranged so that their wedge angles are oriented in respective opposite directions.

* * * * *